July 7, 1959  W. F. DAVID  2,893,155
TROLLING JIG
Filed April 23, 1956
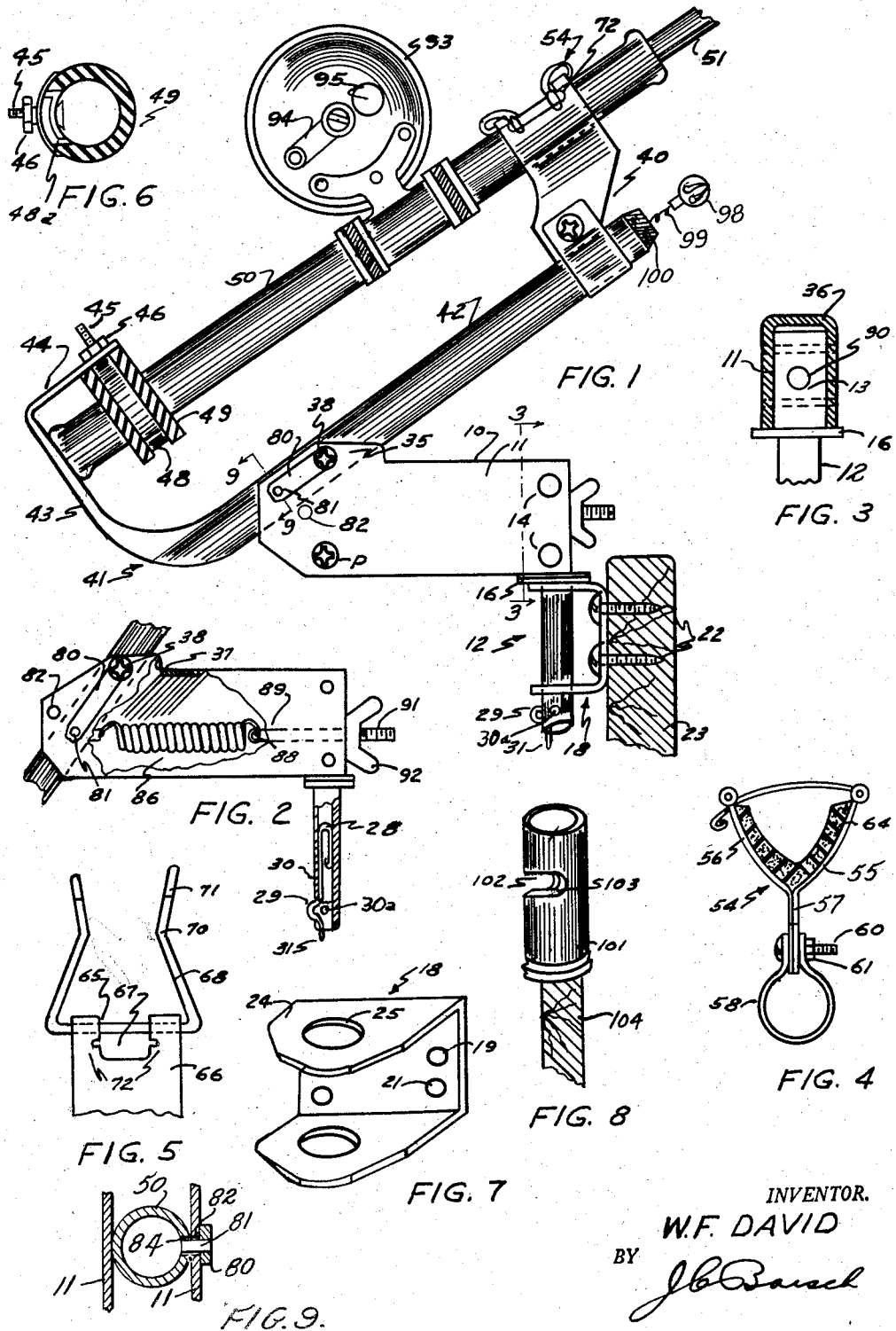
INVENTOR.
W.F. DAVID
BY J.C. Barsch

United States Patent Office 2,893,155
Patented July 7, 1959

2,893,155

TROLLING JIG

William F. David, Whittier, Calif.

Application April 23, 1956, Serial No. 579,945

4 Claims. (Cl. 43—16)

This invention relates generally to fishing equipment and relates more particularly to a trolling jig.

In trolling there are times when it is desirable for the fisherman not to have to hold the fishing rod and it is an object of the invention to provide a simple and effective trolling jig for holding the rod and provide other functions, features and advantages hereinafter described.

Another object of the invention is to provide a device of this character in which a fishing rod is mountable and held at a suitable angle for trolling.

Still another object of the invention is to provide a device of this character which is provided with a spring so that the hooked fish works against said spring as it fights the hook.

A further object of the invention is to provide a device of this character adapted to be set or cocked in a spring loaded position.

A still further object of the invention is to provide a device of this character that is released from the cocked position when the fish strikes or takes the bait.

Another object of the invention is to provide a device of this character which is readily tripped when a fish bites and which will then jerk the line and set the hook.

Still another object of the invention is to provide a device of this character having means for correlating the spring which loads the jig, and the brake of the reel to maintain an even tension on the line.

A further object of the invention is to provide a device of this character adapted to pivot to follow the course of the caught fish.

A still further object of the invention is to provide a device of this character that may be mounted in an oar lock of a boat or in other suitable receptacle means in which the device is adapted to pivot.

Another object of the invention is to provide a device of this character in which the rod may be easily and quickly mounted or removed.

Still another object of the invention is to provide a device of this character adapted to accommodate rods of various types and sizes having handles of various sizes and lengths.

A further object of the invention is to provide a device of this character having a signal to warn or arouse the fisherman when a fish has been hooked or caught.

A still further object of the invention is to provide a device of the character that is automatic in operation.

Another object of the invention is to provide a device of this character having means for varying the spring loading of the same.

Still another object of the invention is to provide a device of this character that is sturdy in construction and relatively inexpensive to manufacture.

The characteristics and advantages of the invention are further sufficiently referred to in connection with the following detailed description of the accompanying drawings which represent one embodiment. After considering this example, skilled persons will understand that many variations may be made without departing from the principles disclosed, and I contemplate the employment of any structures, arrangements or modes of operation that are properly within the scope of the appended claims.

Referring to the drawings:

Fig. 1 is a side elevation of a trolling jig embodying the present invention, the handle of a fishing rod being mounted therein;

Fig. 2 is a side view of the bracket with portions broken away to show interior parts;

Fig. 3 is a section taken on line 3—3 of Fig. 1;

Fig. 4 is an end view of the forward pole clamp, the locking means thereof being in the closed position;

Fig. 5 is a view of the spring locking means of said forward pole clamp, said locking means being in the open position;

Fig. 6 is an end view of the receptacle for the butt end of the rod handle;

Fig. 7 is a perspective view of an oar lock of a boat in which the trolling jig is adapted to be mounted;

Fig. 8 is a perspective view of an alternative receptacle for the mounting pin of the jig, said receptacle being adapted to be mounted on any suitable support, such as, for example, a stake which may be driven into the ground and Fig. 9 is an enlarged sectional view taken on line 9—9 of Fig. 1.

Referring more particularly to the drawings, the device comprises a bracket, indicated generally at 10, having a body 11 of the shape of an inverted U, as best shown in Fig. 3. At one end of the body there is provided a tubular pivot pin 12 having the upper end portion 13 received between the sides or arms of the body and secured by any suitable means such as, for example rivets 14 received in respective aligned holes in said sides and said portion 13, said rivets being spaced apart longitudinally relative to said pin. Any other suitable means may be employed to secure said pin in the above described position, such as, screws, brazing, welding or the like. The pin 12 is provided with an annular flange 16 secured to said pin by brazing, welding or any other suitable means, just below the lower edges of the sides of the body 11 and engaging said edges. Flange 16 serves as a stop and as a bearing which rests on the upper end of the receptacle in which said pivot pin 12 is pivotally mounted. As shown in Fig. 1 the pivot pin 12 is operably mounted in an oar lock, indicated generally at 18. This oar lock comprises a piece of sheet metal of generally U-shape having a vertical portion 19 with openings 21 therein for screws 22 for attaching the oar lock to the side 23 of a boat. There are a pair of vertically spaced horizontal arms 24 having aligned openings 25 therein for pivotal reception of the pivot pin 12, said bearing 16 resting on the upper one of the arms 24.

Means is provided for easily and quickly and releasably locking the pivot pin 12 in the oar lock, said means comprising a wire spring having an elongated loop 28 at one end resiliently disposed in the tubular interior of the pin 12. One arm of the spring extends downwardly of the loop and has a relatively small, laterally turned, generally U-shaped part 29 which is in the same plane as the loop 28 and which extends through an opening 30 provided therefor in the pin 12 adjacent the lower end thereof, as best shown in Figs. 1 and 2. There is also a short free end portion 31 depending from the lower arm of the U-shaped part 29. The part 29 is short enough laterally to permit the spring to be inserted and removed from the pin 12 and yet long enough to project outwardly of the surface of said pin to resist removal of the pin from the oar lock. However, because of the rounded outer end of said part 29 the pin may be inserted into and removed from the oar lock by application of a reasonable amount of force.

At the end of the body 11 opposite the pin 12, the sides of said body are enlarged, as at 35, the top wall 36 of the body terminates at 37 at the beginning of the enlarged portion 35. Adjacent the upper outer end of the body a pivot pin 38 is disposed, said pin having its ends received in aligned openings provided therefor in the sides of the body 11. The pivot pin 38 pivotally supports a rod supporting frame, indicated generally at 40, said frame including a member 41 comprising a tubular portion 42 having transversely aligned openings adjacent the lower end receiving said pivot 38 for pivotal or swinging movement thereon.

At the lower end said tubular part 42 is flattened and said flattened portion is turned laterally upwardly at 43, the portion 43 being turned at right angles to provide a receptacle support portion 44 substantially parallel to the tubular portion 42. The support portion 44 has an annular receptacle secured thereto by means of a screw 45 and nut 46, said receptacle comprising an annular metal band 48 in which is received an annular pad or cushion 49 to prevent scratching or marring the handle 50 of the fishing rod 51 which is received in said receptacle with the butt end of said handle abutting against said portion 43. The ends of the band 48 have slots 48a to permit adjustment of the diameter of said receptacle.

A rod handle clamp, indicated generally at 54, is provided at the forward end of the tubular portion 42, said clamp comprising a pair of oppositely arranged pieces 55 and 56 of sheet metal, having their lower end portions 57 secured together by any suitable means, for example spot welding, or riveting or the like. The upper end portions of said pieces being curved upwardly and outwardly so that the assembled pieces are generally Y-shaped. An attaching clamp 58 is provided, comprising a strip of material including a generally cylindrical portion received on the tubular portion 42, the free end portions of said strip of material being turned outwardly on opposite sides respectively of the portions 57. A screw 60 is received in openings provided therefor in said portions 57 and the free end portions of said strip, a nut 61 serving to tighten the clamp on the tubular portion 42, said clamp being adjustably slidable on said tubular member to adjust to rod handles of various lengths. It is to be noted that if desired, the clamp 54 may be reversed on the portion 42 to accommodate a handle.

Within the open part of the Y of the clamp 54 padding 64 is disposed, said padding being shown as of sponge rubber but may be of any other suitable material. The padding may be secured in place by an adhesive of any suitable character or by other suitable means. At the free upper ends of the pieces 56 and 57 handle securing means is provided and, as shown in Figs. 4 and 5, comprises a piece of wire of resilient characteristics having a straight central portion 65 rotatably received in axially aligned bearings at the upper free end of the piece 57, said bearings being formed by suitably turning the ends of ears 66 which are spaced apart by a notch 67 in the free end of said piece 57. The wire of said securing means is generally U-shaped, the portion 65 being the closed end of the U. The arms of the U have portions 68 inclined inwardly toward each other and there is an outwardly inclined free end portion 70 for each arm, terminating in a loop 71 adapted to be engaged by the fingers to press the free ends of said arms toward each other. The free end of the piece 56 is provided with a notch similar to the notch 67 and includes outwardly extending parts, such as parts 72, for reception of the respective arms of the securing means. The arms of said securing means are pressed toward each other when securing and releasing a rod handle and the resilience of the wire causes the arms to enter said notch portions 72 thereby locking the arms in place and securing the handle 50 in the open part of the Y. It is to be noted that the upper arms of the Y may be bent toward or away from each other to accommodate handles of different sizes.

Means is provided for releasably securing the frame 41 in a cocked position, said means comprises a leaf spring 80 at the outer side of one of the sides 11 of the body 10, one end of said spring being secured under the adjacent turned over end of the pivot pin 38, the free end of said spring 80 being normally positioned outwardly of the outer surface of said side and has a lug 81 secured to said end. Lug 81 extends toward said body side and the free end of said lug is normally spaced outwardly of the plane of the surface of said side. The side of the body to which the spring is secured is provided with a plurality of openings 82 spaced apart and each being radially spaced from the pivot pin 38 for reception of the lug 81, said spring 80 being pivotally mounted on said pin 38 so that the lug 81 may be positioned over one or the other of said openings 82. The tubular portion 42 is provided with an opening 84 below the pivot 38 radially spaced from said pivot pin a distance equal to the radial spacing of the openings 82 therefrom so that said tubular portion may be pivotally swung to various cocked positions whereat said opening 84 is aligned with either of said openings 82, and when thus aligned, the lug 81 may be pressed into said aligned openings. Releasable retention of the lug in said aligned openings is effected by placing the frame 41 under spring loading and this is effected by a spring 86 disposed within the body 10 between the sides thereof. The spring extends longitudinally in said body and one end of said spring is hooked onto an eye 87 secured to the tubular portion 42 adjacent said opening 84. The opposite end of said spring 86 is secured to an eye 88 of a rod 89 extending outwardly of the adjacent end of the body 10 through aligned openings 90 provided therefor in the upper end 13 of the pivot pin 12. The outer end portion of rod 89 is threaded, as at 91, for threadable reception of a wing nut 92 for adjusting the tension of said spring 86.

Assuming the frame 41 is secured in the cocked position shown in Fig. 1 by pressing the lug 81 in one opening 82 aligned with the opening 84. The force of spring 86 will effectively hold the lug in this position by friction. The rod handle 50 will be retained in the jig frame 41, as shown, and carries a reel 93 of any well known type, having a crank 94 and a brake the effectiveness of which is adjustable by well known means, such as a knob 95. In view of the fact that various well known reels having well known adjustable brakes may be used, it is believed unnecessary to show details thereof.

With the rod 51 thus positioned and the line trailing the boat for trolling, the fisherman is free to operate the boat. When a fish bites or strikes the resistance of the brake of the reel is sufficient to cause the free end of the rod to be pulled downwardly sufficiently to release the frictional engagement of the lug 81 in the above described aligned openings 82 and 84 and the resilience of spring 80 will snap the lug from said openings so that the rod will be swung upwardly and rearwardly, in the counter clockwise direction as viewed in Fig. 1. The hooked fish will then be fighting against the force of spring 86 which is of such character as to provide considerable resistance to the pulling of the fish on the line. By properly adjusting the effectiveness of the reel brake in connection with the spring 86 the line will be maintained under even tension. Also the resistance of spring 86 will wear out the fish. A pin P, extending between the sides 11 and having their ends secured in aligned openings in said sides, serves as a stop to limit counter clockwise movement of the frame 41 under the influence of spring 86 so the rod will be retained in a substantially vertical position.

A bell 98 is attached to a spring 99 mounted in a plug 100 in the open upper end of the tubular portion 42, said bell serving as a warning signal means to arouse the fisherman to the fact that a fish has been caught.

In Fig. 8 there is shown an alternative socket for the pivot pin 12, said socket being indicated at 101 and is tubular. When the pin 12 is disposed in the socket the part 29 of the snap spring in said pin is disposed in the notch 102 of said socket and the jig may pivot in said socket, limited by engagement of the spring part 29 with the ends 103 of said notch. The socket may be mounted on any suitable support, one such support being a rod or pole 104 which may be driven into the ground.

If desired the pin 12 may be secured in either socket by inserting a pin or screw through oppositely disposed openings 30a at the lower end of said pin 12.

It is thought that the invention and many of its attendant advantages will be understood from the foregoing descripion and it is thought that it will be apparent that various changes may be made in the form, construction and arrangement of the parts of the invention without departing from the spirit and scope thereof or sacrificing all of its material advantages, the forms hereinbefore described being merely illustrative embodiments.

I claim:

1. In combination: a bracket including a hollow body having sides, a tubular bracket pivot pin having an upper portion secured to said body at one end thereof and having a depending portion formed with an opening adjacent the lower end thereof, said pivot pin being operably receivable in a socket, spring means in said pivot pin having a part adapted to releasably retain said pivot pin in said socket, the sides of said body having aligned openings formed therethrough and one of said sides having a plurality of lug receiving openings spaced radially from the axis of said aligned openings and arcuately spaced from each other; a frame member comprising a tubular portion having aligned openings and a lug receiving opening adjacent the lower end, a pivot pin in the aligned openings of said sides and operably received in the aligned openings of said tubular portion, the lug receiving opening of said tubular portion being registerable with said lug receiving openings of said one side, said tubular portion being flattened at the lower end and said flattened part being turned laterally upwardly and having a free end portion turned upwardly and parallel with said tubular portion; an annular rod handle receptacle secured to said free end portion and spaced in front of said free portion; a rod handle clamp on said tubular portion, said clamp being adjustable longitudinally on said tubular portion, and being adjustable for reception of handles of various size; yielding means urging said frame member toward an upright position; means for adjusting the effective force of said spring; a lug receivable in said lug openings; resilient means securing said lug to said body and normally positioning said lug out of said openings; a warning device warning when a fish has been caught; a rod having its handle removably secured in said receptacle and clamp; and a reel on said handle, said reel having brake means and means for adjusting the effectiveness of said brake means.

2. In combination: a bracket including a hollow body having sides, a tubular bracket pivot pin having an upper portion secured to said body at one end thereof and having a depending portion formed with an opening adjacent the lower end thereof, said pivot pin being operably receivable in a socket, spring means in said pivot pin having a part adapted to releasably retain said pivot pin in said socket, said sides of said body having aligned openings formed therethrough and one of said sides having a plurality of lug receiving openings spaced radially from the axis of said aligned openings and arcuately spaced from each other; a frame member comprising a tubular portion having aligned openings adjacent the lower end, a pivot pin in the aligned openings of said sides and operably received in the aligned openings of said tubular portion, said tubular portion also having a lug receiving opening in one side and longitudinally spaced from the aligned openings, the lug receiving opening of said tubular portion being registerable with said lug receiving openings of said one side, said tubular portion being flattened at the lower end and said flattened part being turned laterally upwardly and having a free end portion turned upwardly and parallel with said tubular portion; an annular rod handle receptacle secured to said free end portion spaced in front of said free end portion; a rod handle clamp on said tubular portion, said clamp being adjustable longitudinally on said tubular portion, and being adjustable for reception of handles of various size; yielding means urging said frame member toward an upright position; means for adjusting the effective force of said spring; a lug receivable in said lug openings; resilient means securing said lug to said body and normally positioning said lug out of said openings; a rod having its handle removably secured in said receptacle and clamp; and a reel on said handle, said reel having brake means and means for adjusting the effectiveness of said brake means.

3. In a device of the character described: a bracket including a hollow body having sides, a tubular bracket pivot pin having an upper portion secured to said body at one end thereof and having a depending portion with an opening adjacent the lower end thereof, said pivot pin being operably receivable in a socket, spring means in said pivot pin having a part adapted to releasably retain said pivot pin in said socket, the sides of said body having aligned openings and one of said sides having a plurality of lug receiving openings spaced radially from the axis of said aligned openings and arcuately spaced from each other; a frame member comprising a tubular portion having aligned openings adjacent the lower end; a pivot pin in the aligned openings of said sides and operably received in the aligned openings of said tubular portion, a lug receiving opening in said tubular portion registerable selectively with said lug receiving openings of said one side, said tubular portion being flattened at the lower end and said flattened part being turned laterally upwardly and having a free end portion turned upwardly and parallel with said tubular portion; an annular rod handle receptacle secured to said free end portion spaced in front of said upwardly turned portion; a rod handle clamp on said tubular portion; yielding means urging said frame member to an upright position; a lug receivable in said lug openings; and resilient means securing said lug to said body and normally positioning said lug out of said openings.

4. In a trolling jig: a bracket including a body and a pivot pin thereon adapted to be mounted in a socket; a frame pivotally mounted to said body, said frame being swingable in a vertical plane and having a latch lug receiving opening formed therein; yielding means for loading said frame and urging same toward an upright position; a latch for releasably latching said frame in a forwardly inclined position, said latch including a leaf spring secured at one end to said body and having a lug at the other end releasably received in said lug receiving opening of the frame, the end of said spring carrying the lug being normally positioned so that said lug is out of said lug receiving opening; and means for releasably securing the handle of a fishing rod to said frame.

References Cited in the file of this patent

UNITED STATES PATENTS

| | | |
|---|---|---|
| 889,974 | Schreidt | June 9, 1908 |
| 2,184,583 | Danko | Dec. 26, 1939 |
| 2,204,692 | Parisio | June 18, 1940 |
| 2,473,778 | Benes | June 21, 1949 |
| 2,618,090 | Kimura | Nov. 18, 1952 |
| 2,703,465 | Stefano | Mar. 8, 1955 |